United States Patent [19]
Zinn et al.

[11] 4,270,596
[45] Jun. 2, 1981

[54] TUBE MAT HEAT EXCHANGER

[75] Inventors: Michael F. Zinn; Steven E. Krulick; Ronald W. Leonard, all of Spring Glen, N.Y.

[73] Assignee: Bio-Energy Systems, Inc., Ellenville, N.Y.

[21] Appl. No.: 17,728

[22] Filed: Mar. 5, 1979

[51] Int. Cl.³ .............................. F28F 7/00; F24J 3/02
[52] U.S. Cl. .......................................... 165/1; 165/46; 165/49; 165/171; 165/176; 126/426; 126/431; 126/447
[58] Field of Search ................ 165/46, 49, 1, 53, 171, 165/176; 264/274; 126/426, 431, 447, 448, 445, 449, 446; 138/115, 116; 285/188; 428/43; 52/389; 4/498, 499, 503; 206/601, 602, 605, 610

[56] References Cited

U.S. PATENT DOCUMENTS

| 338,815 | 3/1886 | Yule | 138/115 |
| 2,594,232 | 4/1952 | Stockstill | 165/171 |
| 3,907,002 | 9/1975 | Gülich | 138/115 |
| 4,060,070 | 11/1977 | Harter | 126/426 X |
| 4,112,921 | 9/1978 | MacCracken | 126/448 |
| 4,176,654 | 12/1979 | Zinn et al. | 126/448 |

Primary Examiner—Albert W. Davis
Assistant Examiner—Margaret A. Focarino
Attorney, Agent, or Firm—Charles J. Brown

[57] ABSTRACT

A heat exchanger adapted particularly for use in embedded radiant heating systems and including a plurality of webbed tube mats and associated manifolds, wherein the webs are separated from their adjacent tubes along tear lines at at least two longitudinally spaced portions of the mat.

28 Claims, 7 Drawing Figures

TUBE MAT HEAT EXCHANGER

BACKGROUND OF THE INVENTION

Prior art radiant heating systems typically employ copper pipe embedded within a concrete slab, or beneath a slab in sand for additional thermal mass. Heated water is circulated through the pipes to transfer thermal energy to the concrete or sand and heat the space above the slab by radiation. Significant disadvantages in systems of this type have been recognized and it is the purpose of the present invention to provide an improved heat exchanger design which overcomes those disadvantages.

Heat transfer systems using copper pipe are subject to corrosion particularly by alkali in the concrete, and thermal expansion and contraction of the pipes and shifting or cracking of the concrete imposes stresses which can cause leaks in the pipe virtually impossible to repair. Concrete has a low rate of heat transfer in comparison to copper and for that reason the use of low temperature water with copper pipe is not economically practical. Copper pipe is quite expensive and the cost of such systems becomes prohibitive unless relatively higher water temperatures are employed.

Perhaps the closest prior art to the tube-stretching inserts of the present invention is Roth U.S. Pat. No. 3,114,969 or Rhinevault U.S. Pat. No. 1,668,978, but neither anticipates the features of the connecting means claimed here. The tube mat per se described below is the subject of U.S. Pat. No. 4,176,654.

SUMMARY OF THE INVENTION

The invention provides a heat exchanger wherein a plurality of parallel fluid-conducting tubes of elastomeric material are formed in an elongated mat with a plurality of flexible webs connecting respective adjacent pairs of the tubes. First and second hollow manifolds are arranged transverse to the fluid-conducting tubes. One end of each tube is connected to the first manifold and one end of each tube is connected to the second manifold with a closed loop fluid-conducting path being defined through each tube from the first to the second manifold. The webs are separated from their adjacent tubes along tear lines at at least two longitudinally spaced portions of the mat.

The invention also provides a method of installing a radiant heat exchanger on a building structure, which heat exchanger includes a plurality of elongated mats of elastomeric material, each mat defining a plurality of fluid-conducting tubes with flexible webs joining adjacent pairs of tubes, and the tubes being connected to respective manifolds. The method comprises removing the webs from between the tubes in at least two longitudinally spaced portions of the mat. The mats are located in place on the building structure so that the mats are substantially coplanar. In a preferred form of the method the mats are covered with a structural matrix.

Among the advantages of the present tube mat heat exchanger system over copper pipe systems of the prior art are the following: The tube mat has a continuous multi-tube profile which is easily covered with thin slabs of concrete. In the event of failure of any one tube it can be clamped off adjacent the manifolds and isolated so that the remainder of the system continues to function properly. Similarly, selected tubes may be clamped off to isolate zones from the heat exchange fluid and thus make it possible to correct areas of overheating. Thermal expansion and contraction of the mat is virtually zero and since it is of elastomeric material freezing cannot cause ruptures. For the same reason, shifting or cracking of the floor does not necessarily damage the tube mat. The system is low in initial cost and is particularly advantageous for efficient low-temperature heat transfer.

Other advantages of the invention will become apparent from the following description taken in conjunction with the accompanying drawings.

DESCRIPTION OF PREFERRED EMBODIMENT

Figures 1, 2:
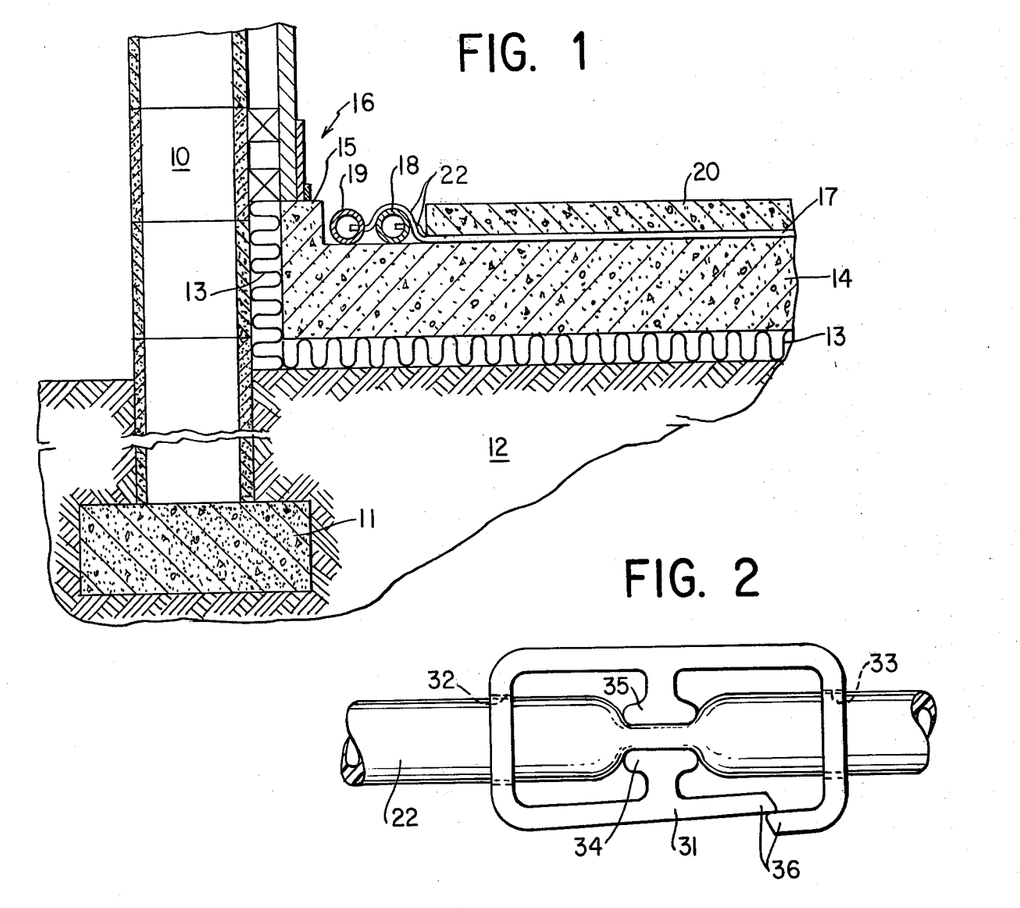
FIG. 1 is a vertical section partly broken away of a typical slab concrete floor employing the tube mat heat exchanger of the invention.
FIG. 2 is a fragmentary view of a clamp for isolating one or more of the tubes.

Referring first to FIG. 1, a typical wall and foundation construction 10 with footings 11 is shown on substrata 12. Underlying insulation 13 is first applied, usually with vapor barriers, either beneath or above the insulation or both. An underlying concrete slab 14 is applied over the insulation within the wall construction 10 and it may include an upstanding peripheral portion 15 supporting typical wall construction components 16. In accordance with the invention, tube mat heat exchangers 17 are disposed over the underlying concrete slab 14 and communicate with at least one pair of first and second manifolds 18 and 19. The manifolds may be located in a trough alongside the peripheral portion 15 of the concrete slab 14 and may be exposed for purposes of connection and subsequent maintenance. A poured concrete floor slab 20 is applied as a matrix over the tube mat heat exchangers 17 so that they are embedded therewithin.

It is understood that certain aspects of the construction described above are only illustrative and may well vary depending upon the particular installation. For example, the tube mat heat exchangers 17 could be applied directly to a sand flooring with the concrete slab 20 applied over them.

Figure 3:
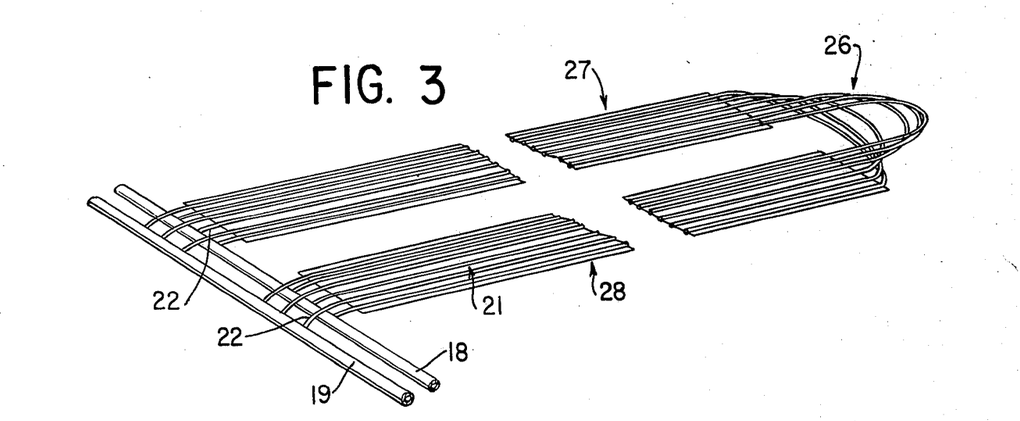
FIG. 3 is a fragmentary perspective view partly broken away showing the tube mats and manifolds of the invention.
Figure 4:
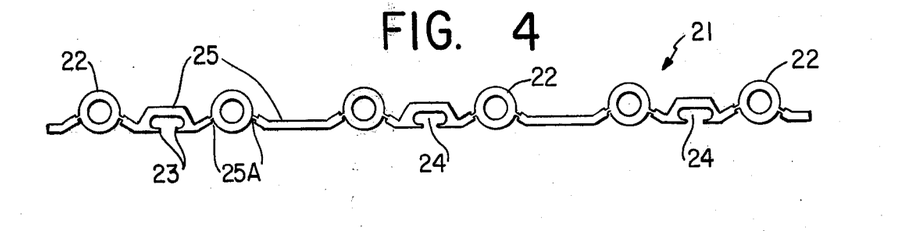
FIG. 4 is a transverse section through one of the tube mats.

In FIGS. 3 and 4, the tube mat construction is shown. A preferred form is described and claimed in detail in the previously mentioned U.S. Pat. No. 4,176,654. Such mats are formed from an integral extrusion of elastomeric material such as synthetic rubber and particularly EPDM (ethylene propylene diene monomer or terpolymer). A given tube mat (see FIGS. 3 and 4) 21 includes a plurality of tubes 22 which are equally spaced parallel to one another. Each tube may have a nominal outside diameter of 0.338 in. and a nominal inside diameter of 0.203 in. so that its wall thickness is 0.067 in. As described in the aforementioned patent the underside of the tube mat may have a plurality of deflectable projections 23 which define a plurality of inwardly diverging recesses 24. In the example shown, there are six of the tubes 22 and three of the recesses 24. Each adjoining pair of tubes is connected by a web 25 which is easily severed lengthwise along tear lines 25A to permit the tubes to be separated.

In radiant heating systems of the prior art employing embedded copper pipe, some form of hold-down devices are typically employed to hold the pipe to the underlying floor. The pipe is usually arranged in a sinusoidal configuration and such devices serve to fix the pipe in place as the concrete slab is poured. One advantage of using the tube mat described above is that the mat may be held in place during the pouring of the concrete by a layer of mastic over the underlying floor which penetrates the recesses 24 to hold the mat in releaseable fashion. This gripping action is mechanical in nature and does not depend upon a chemical bond between the mastic and the elastomeric material of the mat. However, it is to be understood that the invention is equally applicable to tube mats with smooth undersurfaces where other means are relied upon for holding them in place.

Figure 6:
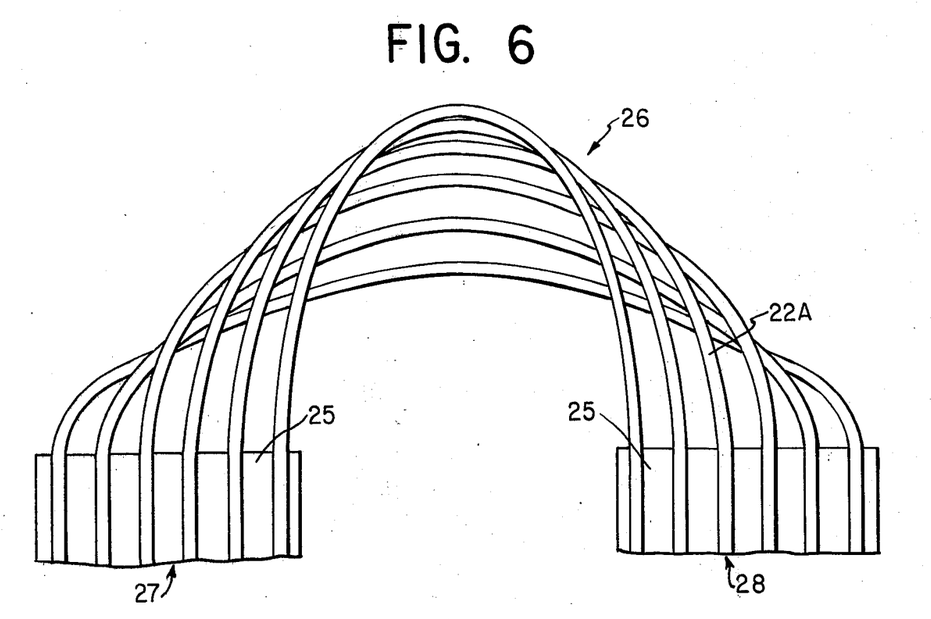
FIG. 6 is a fragmentary plan view of the central section of one of the mats connecting the aligned subsections.

In preparing a given tube mat for installation it is unrolled from an extended length and cut to the desired individual length. The webs 25 between the tubes 22 are removed in a central mat section 26. As shown in FIGS. 3 and 6, resulting subsections 27 and 28 of the mat 21 to each side of the central section 26 are aligned parallel and side-by-side substantially coplanar with the free tubes 22A in the central section 26. By this construction the subsections 27 and 28 are connected to one another through uninterrupted and integral intermediate sections of the various tubes 22 and a low profile is maintained to ensure that the entire mat is readily covered by the concrete floor 20.

Figure 5:
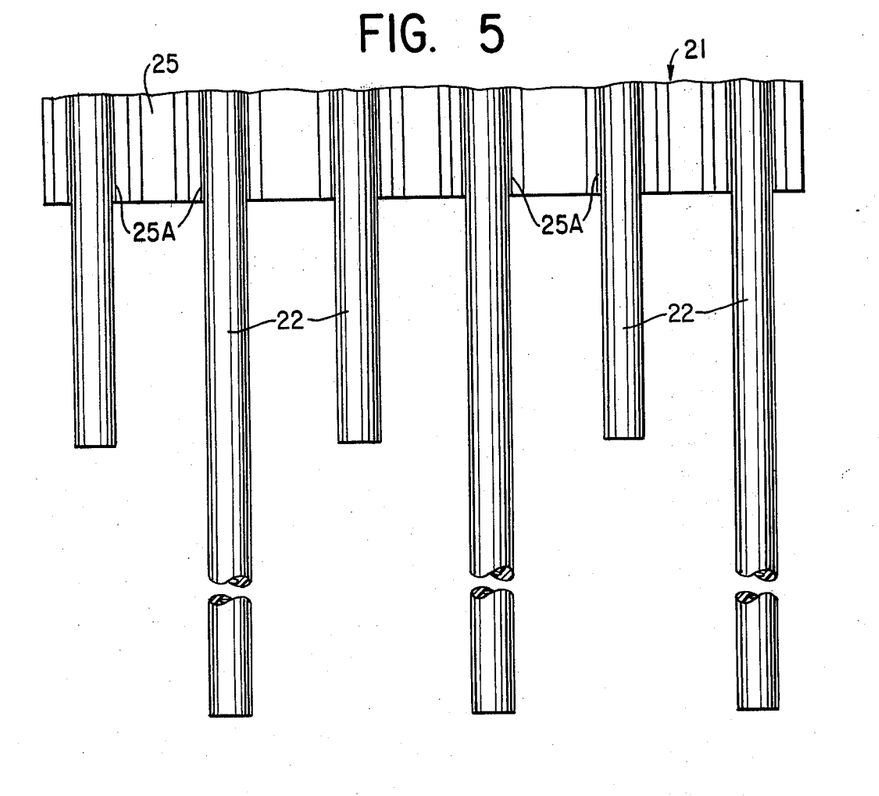
FIG. 5 is a fragmentary plan view of one of the ends of the tube mat adapted for connection to the manifold.

As shown in FIGS. 3 and 5, the tubes 22 are torn free of their webs 25 along the tear lines 25A at the end portions of the mat remote from the central section 26. One end of each of the tubes 22 where it is free of the web is cut relatively long and the other end is cut relatively short for appropriate connection to the respective pair of manifolds 18 and 19. It is apparent, particularly from FIG. 3, that each tube constitutes a loop between the two manifolds and the low-temperature water flowing from one manifold to the other passes through the full length of the mat.

Figure 7:
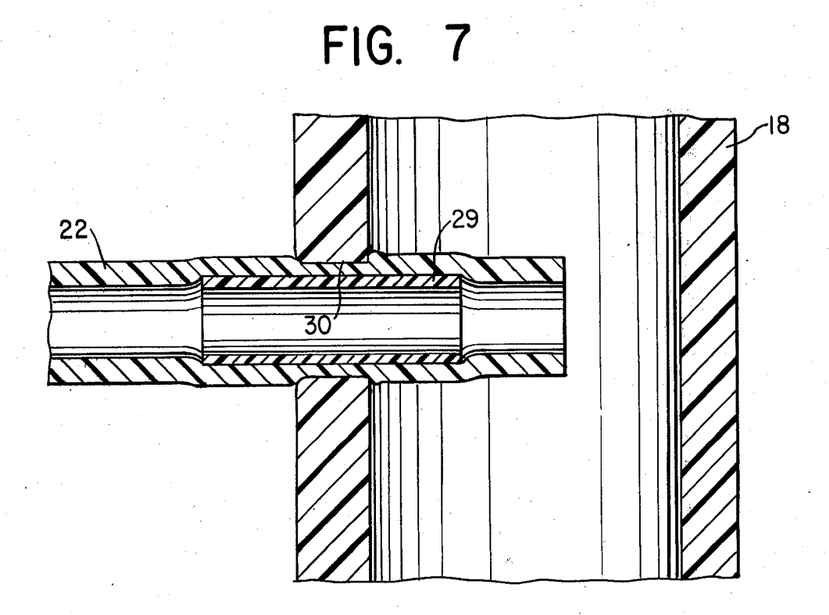
FIG. 7 is an enlarged fragmentary longitudinal section of the connection between one of the tube ends and one of the manifolds.

Referring now to FIG. 7, a given tube 22 is shown in connection with the first manifold 18 through a circular hole in the wall of the manifold. Each tube of the system communicates through such respective holes in the manifold wall at both of the tube ends. The manifolds 18 and 19 may be either of copper or plastic, their inside diameter being approximately one inch if copper and slightly larger if plastic. Their wall thickness may range from 0.150 in. to 0.200 in.

In accordance with the invention, a cylindrical plastic insert 29 is employed, preferably of polytetrafluoroethylene, which is typically three-quarters of an inch long, longer than the manifold wall thickness, and may have an outside diameter of 0.250 in. and an inside diameter of 0.187 in. The insert is pushed into the end of the tube 22 to the position shown in FIG. 7 approximately one-eighth of an inch inside the tube end. It may stretch the tube to an outside diameter greater than elsewhere along the tube.

The respective circular hole 30 in the wall of the manifold 18 has a fixed minimum diameter, for example 0.312 in., which is less than the tube diameter around the insert but greater than the insert outside diameter. The hole is cylindrical and is shown for purposes of illustration as being of constant diameter from the inside to the outside manifold wall surfaces. In practice, however, for a plastic manifold the hole is drilled and chamfered and for a copper manifold it is drilled and punched and, in either case, the cylindrical section of the hole may comprise only part of the manifold wall thickness. The stretched tube end portion is forcibly inserted into the cylindrical hole and is thereby compressed within the hole with the respective ends of the insert extending inwardly and outwardly of the manifold wall. The tube wall around the insert bulges outwardly as shown and seals the periphery of the hole to ensure that the end of the tube is firmly, but releaseably, held in place. With only one additional component, the tube is attached to the manifold without having access to the interior of the manifold.

In FIG. 2 a form of clamp 31 is shown by which one of the tubes 22 may be pinched off to prevent fluid flow. The clamp has aligned holes 32 and 33 through which the end portion of the tube 22 is inserted. Opposed squeezing portions 34 and 35 compress the tube to close it off when end members 36 of the clamp are brought together. Temperature zone control may be achieved with such clamps to correct overheating in certain areas. Also, individual tubes can be clamped off to isolate damage while the operation of the remainder of the system continues unaffected.

The tube mat heat exchangers of the invention provide particularly uniform floor temperatures because they use reversedirectional flow in alternate tubes to accomplish temperature averaging. The tube mats are inert to chemical attack and since they are elastic they readily withstand expansion and contraction due to freezing or shifting of the concrete floor.

The scope of the present invention is set forth in the following claims rather than in the foregoing description of a preferred embodiment.

We claim:

1. In a heat exchanger wherein a plurality of parallel fluid-conducting tubes of elastomeric material are formed in an elongated mat with flexible webs connecting adjacent pairs of the tubes, pairing means for subsections of said mat comprising:
   (a) a central mat section between said subsections being free of said webs between the tubes with the tubes remaining uninterrupted and integral;
   (b) said subsections being arranged substantially coplanar with the free tubes of the central section;
   (c) first and second hollow manifolds; and
   (d) opposite end portions of all of the tubes remote from the central mat section being free of said webs and being connected to the respective hollow manifolds through respective holes in the manifold walls.

2. In a heat exchanger according to claim 1, said webs between the tubes being separable from the tubes along tear lines in the mat.

3. In a heat exchanger according to claim 1, the mat subsections being aligned substantially parallel and side-by-side.

4. In a heat exchanger according to claim 1, said first and second manifolds being disposed side-by-side and transverse to those ends of the aligned subsections of the mat remote from the central section.

5. In a heat exchanger according to claim 1, clamp means for isolating selected tubes from fluid flow within the manifolds.

6. In a heat exchanger according to claim 1, wherein means are provided on the underside of each mat for securing the mat in place.

7. In a heat exchanger according to claim 1, wherein said mat is embedded within a building structure to heat said structure by radiant heat.

8. In a radiant heat exchanger embedded within a building structure and including a plurality of elongated mats of elastomeric material, each mat defining a plurality of parallel fluid-conducting tubes with flexible webs connecting adjacent pairs of tubes and formed with tear lines alongside each tube to permit separation of the webs from the tubes, pairing means for subsections of each of said mats comprising:
  (a) a central mat section between said subsections being free of said webs between the tubes with the tubes remaining uninterrupted and integral;
  (b) said subsections being aligned parallel and side-by-side and substantially coplanar with the free tubes of the central section;
  (c) first and second tubular manifolds disposed side-by-side and transverse to those ends of the aligned subsections of the mat remote from the central section;
  (d) opposite end portions of all the tubes remote from the central mat section being free of said webs and being connected to the respective manifolds through respective circular holes in the manifold walls;
  (e) means on the underside of each mat for securing the mat in place during installation; and
  (f) said mats being embedded within a matrix of poured concrete.

9. In a heat exchanger according to claim 8, each of said tubes having a certain inside and outside diameter, and wherein connecting means are provided joining each tube to the associated manifold comprising:
  (a) a rigid cylindrical insert having an outside diameter at least as great as the inside diameter of the tube and an axial length greater than the axial length of the cylindrical hole in the manifold wall and fitted within an end portion of the tube;
  (b) the hole in the manifold wall having a diameter greater than the insert outside diameter and less than the tube diameter around said insert; and
  (c) the tube end portion around the insert being located and compressed within said hole with the respective ends of the insert extending inwardly and outwardly of the manifold wall.

10. A method of installing a radiant heat exchanger in a building structure, said heat exchanger including a plurality of elongated mats of elastomeric material, each mat defining a plurality of fluid-conducting tubes with flexible webs joining adjacent pairs of tubes, said tubes being connected to respective manifolds, comprising:
  (a) removing said webs from between said tubes in a central section of the mat and leaving the tubes uninterrupted and integral;
  (b) removing said webs from between said tubes at end portions of the mats for connection to the manifolds;
  (c) locating said mats in place on the building structure so that subsections thereof to each side of the central section are substantially coplanar; and
  (d) covering said mats with a structural matrix.

11. A method according to claim 10 wherein said mats are secured to the building structure by means on the underside of the mats.

12. A method according to claim 10 wherein said matrix is poured concrete.

13. A method according to claim 10 wherein the coplanar mat subsections are substantially parallel and side-by-side, and the manifolds are in a side-by-side pair transverse to the mat subsections.

14. A method according to claim 10 wherein certain selected tubes are clamped closed to control heat distribution.

15. In a method according to claim 10 wherein each tube has a certain inside and outside diameter and is connected to each manifold through a cylindrical hole in the manifold wall by steps comprising:
  (a) fitting within an end portion of the tube a cylindrical insert having an outside diameter at least as great as the inside diameter of the tube and an axial length greater than the axial length of the cylindrical hole, said hole having a diameter greater than the insert outside diameter and less than the tube diameter around the insert; and
  (b) forcing the tube end portion within the hole with the respective ends of the insert extending inwardly and outwardly of the manifold wall so that the wall of the tube end portion is compressed within and seals the hole.

16. In a heat exchanger wherein a plurality of parallel fluid-conducting tubes of elastomeric material are formed in an elongated mat with a plurality of flexible webs connecting respective adjacent pairs of tubes, the improvement which comprises:
  (a) first and second hollow manifolds arranged transverse to said fluid-conducting tubes,
  (b) one end of each tube being connected to the first manifold and one end of each tube being connected to the second manifold with a closed fluid-conducting path being defined through each tube from the first to the second manifold,
  (c) the webs being separated from their adjacent tubes along tear lines at at least two longitudinally spaced portions of the mat.

17. A heat exchanger according to claim 16 wherein said manifolds are arranged side-by-side adjacent one end of the mat and at least one of the separated web portions is at a section of the mat remote from the manifolds.

18. A heat exchanger according to claim 16 wherein the tubes are connected alternately to the first and second manifolds so that fluid flows in each tube in a direction opposite to flow in tubes alongside it.

19. A heat exchanger according to claim 16 wherein the webs space substantially apart the tubes which they connect.

20. A heat exchanger according to claim 16 wherein the mat includes means on its underside for securing the mat to a building structure.

21. A method of installing a radiant heat exchanger on a building structure, said heat exchanger including a plurality of fluid conducting tubes formed in elongated mats with flexible webs joining adjacent pairs of tubes, said tubes being connected to respective manifolds, which comprises:

(a) removing said webs from between said tubes at at least two longitudinally spaced portions of each mat,
(b) locating said mats in place on the building structure so that the mats are substantially coplanar, and
(c) covering the mats with concrete.

22. A method according to claim 21 wherein the mats are secured to the building structure by means on the underside of the mats.

23. A method according to claim 21 wherein certain selected tubes are clamped closed to control fluid distribution.

24. A method of installing a heat exchanger on a building structure, said heat exchanger including a plurality of fluid-conducting tubes formed in elongated mats with flexible webs joining and spacing apart adjacent pairs of tubes and being separable therefrom along tear lines, said tubes being connected to respective manifolds, which comprises:
(a) separating said webs along said tear lines and removing the separated webs from between said tubes at at least two longitudinally spaced portions of at least one of the mats; and
(b) locating said mats in place on the building structure so that the mats are substantially coplanar.

25. A method according to claim 24 wherein the mats are covered with a structural matrix.

26. A method according to claim 25 wherein the matrix is concrete.

27. A method according the claim 24 wherein the mats are secured to the building structure by means on the underside of the mats.

28. A method according to claim 24 wherein certain selected tubes are clamped closed to control fluid distribution.

* * * * *

REEXAMINATION CERTIFICATE (124th)
United States Patent [19]
Zinn et al.

[11] B1 4,270,596
[45] Certificate Issued Oct. 4, 1983

[54] TUBE MAT HEAT EXCHANGER

[75] Inventors: Michael F. Zinn; Steven E. Krulick; Ronald W. Leonard, all of Spring Glen, N.Y.

[73] Assignee: Bio-Energy System, Inc., Ellenville, N.Y.

Reexamination Request:
No. 90/000,291, Nov. 22, 1982

Reexamination Certificate for:
Patent No.: 4,270,596
Issued: Jun. 2, 1981
Appl. No.: 17,728
Filed: Mar. 5, 1979

[51] Int. Cl.³ .......................... F28F 1/22; F28F 1/16; F28F 9/04
[52] U.S. Cl. .......................................... 165/1; 165/46; 165/49; 165/56; 165/171; 165/175; 126/426; 126/431; 126/447

[58] Field of Search ................. 165/46, 1, 49, 56, 171, 165/176, 175; 126/426, 431, 447, 448

[56] References Cited

U.S. PATENT DOCUMENTS

| | | | |
|---|---|---|---|
| 2,162,083 | 6/1939 | Higham | 165/76 |
| 2,916,055 | 12/1959 | Brumbach | 138/87 |
| 3,648,768 | 3/1972 | Scholl | 165/76 |
| 3,751,935 | 8/1973 | MacCracken et al. | 165/46 X |
| 3,893,507 | 6/1975 | MacCracken | 165/46 |
| 4,112,921 | 9/1978 | MacCracken | 126/448 |
| 4,176,654 | 12/1979 | Zinn et al. | 165/171 |

FOREIGN PATENT DOCUMENTS 2204167  8/1973  Fed. Rep. of Germany.

*Primary Examiner*—Albert W. Davis, Jr.

[57] ABSTRACT

A heat exchanger adapted particularly for use in embedded radiant heating systems and including a plurality of webbed tube mats and associated manifolds, wherein the webs are separated from their adjacent tubes along tear lines at at least two longitudinally spaced portions of the mat.

B1 4,270,596

REEXAMINATION CERTIFICATE ISSUED UNDER 35 U.S.C. 307.

TUBE MAT HEAT EXCHANGER

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-28 having been finally determined to be unpatentable, are cancelled.

New claims 29-56 are added and determined to be patentable.

29. *A heat exchanger element comprising*
    *(a) a plurality of flexible elongated rollout mats integrally extruded of elastomeric material;*
    *(b) each of said mats comprising*
        *i. a plurality of flexible parallel fluid-conducting tubes,*
        *ii. a plurality of flexible webs in each mat connecting and spacing adjacent pairs of tubes, and*
        *iii. a pair of tear lines connecting each web to its associated pair of tubes;*
    *(c) first and second hollow manifolds;*
    *(d) at least two longitudinally spaced portions of the tubes on each mat being torn free of said webs along said pair of tear lines; and*
    *(e) the tube end portions being connected to said manifolds through respective holes in the manifold walls to define closed fluid-conducting paths from the first to the second manifold.*

30. *A heat exchanger element according to claim 29 wherein the webs are torn free from the tube portions and the torn free webs are removed from the mat.*

31. *A heat exchanger element according to claim 29 wherein the flexible tubes in a central portion of each mat are torn free of the associated webs along said pair of tear lines with the freed tubes in said central portion remaining uninterrupted and integral.*

32. *A heat exchanger element according to claim 31 wherein the webs from which the central tube portions are torn free are removed from the mat.*

33. *A heat exchanger element according to claim 31 wherein mat sections at each side of said central portion of the tubes are aligned co-planar and substantially parallel and side-by-side.*

34. *A heat exchanger element according to claim 33 wherein the first and second manifolds are disposed side-by-side and transverse to those ends of the mat sections remote from said central portion of the mat.*

35. *A heat exchanger element according to claim 29 wherein clamp means are provided for isolating selected tubes from fluid flow within the manifolds.*

36. *A heat exchanger element according to claim 29 wherein said mats are located substantially co-planar on a building structure.*

37. *A heat exchanger element according to claim 29 wherein said mats are embedded within a building structure to heat said structure by radiant heat.*

38. *A heat exchanger element according to claim 29 wherein each of the tubes has a certain inside and outside diameter and wherein connecting means are provided joining each tube to the associated manifold through a cylindrical hole in the wall thereof comprising*
    *(a) a rigid cylindrical insert having an outside diameter at least as great as the inside diameter of the tube and an axial length greater than the axial length of the cylindrical hole in the manifold wall and pre-fitted within an end portion of the tube;*
    *(b) the hole in the manifold wall having a diameter greater than the insert outside diameter and less than the tube diameter around said insert; and*
    *(c) the tube end portion around the insert being located and compressed within said hole entirely from the exterior of the manifold with the respective ends of the insert extending inwardly and outwardly of the manifold wall.*

39. *A heat exchanger element comprising*
    *(a) a plurality of flexible elongated rollout mats integrally extruded of elastomeric material;*
    *(b) each of the mats comprising*
        *i. a plurality of flexible parallel fluid-conducting tubes,*
        *ii. a plurality of flexible webs in each mat connecting and spacing adjacent pairs of tubes,*
        *iii. a pair of tear lines connecting each web to its associated pair of tubes; and*
    *(c) first and second hollow manifolds;*
    *(d) the flexible tubes in a central portion and end portions of each mat being torn free of the associated webs along said pair of tear lines;*
    *(e) the webs from which the tube central and end portions are torn free being removed from the mat;*
    *(f) mat sections at each side of the tube central portions being aligned co-planar and substantially side-by-side on a building structure,*
    *(g) the manifolds being disposed side-by-side and transverse to those ends of the aligned mat sections remote from the central portion of the mat;*
    *(h) opposite end portions of all of the tubes remote from each central mat section being forcibly connected to the respective hollow manifolds through respective holes in the manifold walls.*

40. *In a heat exchanger element wherein a plurality of parallel fluid-conducting tubes of elastomeric material are formed in an elongated mat with flexible webs connecting adjacent pairs of the tubes, pairing means for subsections of said mat comprising*
    *(a) a central mat section between said subsections being free of said webs between the tubes with the tubes remaining uninterrupted and integral;*
    *(b) said subsections being arranged substantially parallel and side-by-side co-planar with the free tubes of the central section;*
    *(c) first and second hollow manifolds; and*
    *(d) opposite end portions of all of the tubes remote from the central mat section being free of said webs and being connected to the respective hollow manifolds through respective holes in the manifold walls.*

41. *In a heat exchanger element according to claim 40, said webs between the tubes being separable from the tubes along tear lines in the mat.*

42. *In a heat exchanger element according to claim 40, said first and second manifolds being disposed side-by-side* transverse to those ends of the aligned subsections of the mat remote from the central section.

43. In a heat exchanger element according to claim 40, clamp means for isolating selected tubes from fluid flow within the manifolds.

44. In a heat exchanger element according to claim 40, means being provided on the underside of each mat for securing the mat in place.

45. In a heat exchanger element according to claim 40, said mats being located substantially co-planar on a building structure.

46. In a heat exchanger element according to claim 40 said mat being embedded within a building structure to heat said structure by radiant heat.

47. A method of installing a heat exchanger element on a building structure which comprises
   (a) unrolling a plurality of extended lengths of flexible elongated mats each integrally extruded of elastomeric material and each comprising a plurality of flexible parallel fluid-conducting tubes with flexible webs joining and spacing apart adjacent pairs of tubes and being separable therefrom along pairs of tear lines,
   (b) cutting said unrolled mats to desired lengths
   (c) tearing free said tubes along said tear lines so that the freed tubes are separated from their webs at at least two longitudinally spaced portions of the mat length,
   (d) connecting the tubes to respective manifolds, and
   (e) locating the mats on the building structure so that the mats are substantially co-planar.

48. A method according to claim 47 which includes the step of removing from the mat the webs from which the tubes are torn free.

49. A method according to claim 47 which includes the step of freeing a central portion of the tubes in each mat from the associated webs along said pair of tear lines with the tubes in said central portion remaining uninterrupted and integral.

50. A method according to claim 49 which includes the step of removing from the mat the webs from which the central portion of the tubes are freed.

51. A method according to claim 47 which includes covering the mats with a structural matrix.

52. A method according to claim 47 wherein the matrix is concrete.

53. A method according to claim 47 which includes securing the mats to the building structure by means on the underside of the mats.

54. A method according to claim 47 which includes clamping closed certain selected tubes to control fluid distribution.

55. A method according to claim 47 which includes forcibly connecting each freed end tube portion with a hole in its associated manifold.

56. A method according to claim 55 wherein the hole is cylindrical and is formed in a wall of the manifold and which includes the steps of:
   (a) pre-fitting within an end portion of the tube a cylindrical insert having an outside diameter at least as great as the inside diameter of the tube and an axial length greater than the axial length of the cylindrical hole, said hole having a diameter greater than the insert outside diameter and less than the tube diameter around the insert; and
   (b) forcing the tube end portion within the hole entirely from the exterior of the hollow manifold with the respective ends of the insert extending inwardly and outwardly of the manifold wall so that the wall of the tube end portion is compressed within and seals the hole.

* * * * *